US008111928B2

(12) United States Patent
Van Hook et al.

(10) Patent No.: US 8,111,928 B2
(45) Date of Patent: Feb. 7, 2012

(54) METHOD AND APPARATUS FOR COMPRESSION OF MULTI-SAMPLED ANTI-ALIASING COLOR DATA

(75) Inventors: Timothy J. Van Hook, Atherton, CA (US); Farhad Fouladi, Los Altos Hills, CA (US); Gordon Elder, Los Altos, CA (US)

(73) Assignee: ATI Technologies ULC, Markham, Ontario (CA)

( * ) Notice: Subject to any disclaimer, the term of this patent is extended or adjusted under 35 U.S.C. 154(b) by 1005 days.

(21) Appl. No.: 10/672,707

(22) Filed: Sep. 26, 2003

(65) Prior Publication Data

US 2004/0161146 A1 Aug. 19, 2004

Related U.S. Application Data

(60) Provisional application No. 60/447,206, filed on Feb. 13, 2003.

(51) Int. Cl.
*G06K 9/36* (2006.01)
(52) U.S. Cl. ........................................ 382/232; 345/555
(58) Field of Classification Search ........................ None
See application file for complete search history.

(56) References Cited

U.S. PATENT DOCUMENTS

| | | | |
|---|---|---|---|
| 4,580,134 A | 4/1986 | Campbell et al. | |
| 4,821,208 A | 4/1989 | Ryan et al. | |
| 4,887,151 A | 12/1989 | Wataya | |
| 4,974,071 A | 11/1990 | Maeda | |
| 5,045,852 A | 9/1991 | Mitchell et al. | |
| 5,046,119 A | 9/1991 | Hoffert | |
| 5,047,853 A | 9/1991 | Hoffert et al. | |
| 5,218,431 A | 6/1993 | Gleicher et al. | |
| 5,263,136 A * | 11/1993 | DeAguiar et al. | ............ 345/538 |
| 5,287,200 A | 2/1994 | Sullivan et al. | |
| 5,430,464 A | 7/1995 | Lumelsky | |

(Continued)

FOREIGN PATENT DOCUMENTS

JP 5216993 8/1998

(Continued)

OTHER PUBLICATIONS

Dasarathy, Belur V.; Image Data Compression—Block Truncation Coding; IEEE; pp. 55-121; Los Alamitos, California; Jun. 1995.

(Continued)

*Primary Examiner* — Bhavesh Mehta
*Assistant Examiner* — Sean Motsinger
(74) *Attorney, Agent, or Firm* — Baker & Daniels LLP

(57) ABSTRACT

The present invention provides a scheme for compressing the color components of image data, and in particular, data used in multi-sampled anti-aliasing applications. Adjacent pixels are grouped into rectangular tiles, with the sample colors stored in compressed formats accessible via an encoded pointer. In one embodiment, duplicate colors are stored once. Unlike prior compression schemes that rely on pixel to pixel correlation, the present invention takes advantages of the sample to sample correlation that exists within the pixels. A memory and graphics processor configuration incorporating the tile compression schemes is also provided. The configuration defines the tile sizes in main memory and cache memory. In one embodiment, graphics processor relies on a Tile Format Table (TFT) to process incoming tiles in compressed formats. The present invention reduces memory consumption and speeds up essential and oft-repeated operations in rendering. Thus it is valuable in the design and manufacture of graphic sub-systems.

38 Claims, 10 Drawing Sheets

U.S. PATENT DOCUMENTS

| | | |
|---|---|---|
| 5,452,017 A | 9/1995 | Hickman |
| 5,463,700 A | 10/1995 | Nakazawa |
| 5,544,286 A | 8/1996 | Laney |
| 5,552,832 A | 9/1996 | Astle |
| 5,576,845 A | 11/1996 | Komatsu |
| 5,585,944 A | 12/1996 | Rodriguez |
| 5,600,373 A | 2/1997 | Chui et al. |
| 5,619,591 A | 4/1997 | Tsang et al. |
| 5,682,152 A | 10/1997 | Wang et al. |
| 5,682,249 A | 10/1997 | Harrington et al. |
| 5,734,744 A | 3/1998 | Wittenstein et al. |
| 5,742,892 A | 4/1998 | Chaddha |
| 5,748,174 A | 5/1998 | Wong et al. |
| 5,748,904 A | 5/1998 | Huang et al. |
| 5,787,192 A | 7/1998 | Takaichi et al. |
| 5,805,226 A | 9/1998 | Jung |
| 5,815,159 A | 9/1998 | Katayama et al. |
| 5,822,460 A | 10/1998 | Kim |
| 5,822,465 A | 10/1998 | Normile et al. |
| 5,847,762 A | 12/1998 | Canfield et al. |
| 5,877,819 A | 3/1999 | Branson |
| 5,903,673 A | 5/1999 | Wang et al. |
| 5,929,862 A * | 7/1999 | Barkans .................. 345/613 |
| 5,956,425 A | 9/1999 | Yoshida |
| 5,956,431 A | 9/1999 | Iourcha et al. |
| 5,959,631 A | 9/1999 | Knittel |
| 5,978,511 A | 11/1999 | Horiuchi et al. |
| 5,987,175 A | 11/1999 | Imaizumi et al. |
| 5,995,122 A | 11/1999 | Hsieh et al. |
| 6,005,971 A | 12/1999 | Bergman et al. |
| 6,009,200 A | 12/1999 | Fujita et al. |
| 6,031,939 A | 2/2000 | Gilbert et al. |
| 6,049,630 A | 4/2000 | Wang et al. |
| 6,052,203 A | 4/2000 | Suzuki et al. |
| 6,075,619 A | 6/2000 | Iizuka |
| 6,111,607 A | 8/2000 | Kameyama |
| 6,125,201 A | 9/2000 | Zador |
| 6,128,000 A * | 10/2000 | Jouppi et al. ............... 345/614 |
| 6,188,394 B1* | 2/2001 | Morein et al. ............. 345/555 |
| 6,192,155 B1 | 2/2001 | Fan |
| 6,195,024 B1 | 2/2001 | Fallon |
| 6,204,859 B1* | 3/2001 | Jouppi et al. ............... 345/592 |
| 6,285,711 B1 | 9/2001 | Ratakonda et al. |
| 6,309,424 B1 | 10/2001 | Fallon |
| 6,320,981 B1 | 11/2001 | Yada |
| 6,349,151 B1 | 2/2002 | Jones et al. |
| 6,438,165 B2 | 8/2002 | Normile |
| 6,529,631 B1 | 3/2003 | Peterson et al. |
| 6,606,417 B1 | 8/2003 | Brechner |
| 6,614,449 B1* | 9/2003 | Morein ..................... 345/611 |
| 6,630,933 B1* | 10/2003 | Van Hook ................. 345/422 |
| 6,658,146 B1 | 12/2003 | Iourcha et al. |
| 6,683,978 B1 | 1/2004 | Iourcha et al. |
| 6,683,979 B1 | 1/2004 | Walker |
| 6,687,410 B1 | 2/2004 | Brown |
| 6,707,939 B1 | 3/2004 | Weinholz et al. |
| 6,724,391 B1* | 4/2004 | Peled et al. .................. 345/555 |
| 6,731,810 B1 | 5/2004 | Miura et al. |
| 6,825,847 B1* | 11/2004 | Molnar et al. ............. 345/555 |
| 6,944,332 B1 | 9/2005 | Brechner |
| 6,990,249 B2 | 1/2006 | Nomura |
| 7,050,641 B1 | 5/2006 | Kharitonenko |
| 7,103,357 B2 | 9/2006 | Kirani et al. |
| 7,158,271 B2 | 1/2007 | Sawada |
| 7,177,371 B1 | 2/2007 | Hudson et al. |
| 7,224,846 B2 | 5/2007 | Fujishiro et al. |
| 7,336,283 B2* | 2/2008 | McCormack et al. ........ 345/543 |
| 7,352,300 B2 | 4/2008 | Fallon |
| 7,355,603 B2 | 4/2008 | Donovan et al. |
| 7,505,624 B2 | 3/2009 | Ogden et al. |
| 7,643,679 B2 | 1/2010 | Iourcha et al. |
| 7,764,833 B2 | 7/2010 | Elder |
| 2002/0097241 A1* | 7/2002 | McCormack et al. ........ 345/423 |
| 2004/0081357 A1 | 4/2004 | Oldcorn et al. |
| 2004/0174379 A1* | 9/2004 | Collodi .................... 345/611 |
| 2004/0228527 A1 | 11/2004 | Pomianowski et al. |
| 2006/0188163 A1* | 8/2006 | Elder ........................ 382/232 |
| 2006/0215914 A1 | 9/2006 | Ogden et al. |
| 2009/0274366 A1 | 11/2009 | Iourcha et al. |

FOREIGN PATENT DOCUMENTS

| | | |
|---|---|---|
| WO | 9708900 | 3/1997 |
| WO | 9918537 | 4/1999 |

OTHER PUBLICATIONS

Schilling, Andreas et al.; Texram: A Smart Memory for Texturing; IEEE Computer Graphics and Applications; May 1996.

Campbell, Graham; Two Bit/Pixel Full Color Encoding; vol. 20, No. 4; 1986.

Yang, C-Y, et al.; Hybrid Adaptive Block Truncation Coding for Image Compression; Optical Engineering, Soc. of Photo-Optical Instrumentation Engineers, Bellingham, U.S.; vol. 36, No. 4; Apr. 1997.

Kugler, Anders; High-Performance Texture Decompression Hardware; The Visual Computer; 1997.

Nasiopoulos, Panos et al.; Adaptive Compression Coding; IEEE Transactions on Communications, New York, U.S.; Aug. 1991.

Knittel, G. et al.; Hardware for Superior Texture Performance; 1996.

Delp, Edward J. et al.; Image Compression Using Block Truncation Coding; IEEE; 1979.

Yang, C.Y. et al.; Use of Radius Weighted Mean to Cluster Two-Class Data; vol. 30, No. 10; Electronics Letters; May 1994.

Russ, John C.; Optimal Grey Scale Images from Multiplane Color Images; vol. 7, No. 4; Journal of Computer-Assisted Microscopy; 1995.

Feng, Yushu et al.; A Dynamic Address Vector Quantization Algorithm Based on Inter-Block and Inter-Color Correlation for Color Image Coding; IEEE; 1989.

Lo, K. T. et al.; New Predictive Classified Vector Quantization Scheme for Image Compression; vol. 30, No. 16; Electronics Letters; Aug. 1994.

Lo, Kowk-Tung; New Classified Vector Quantization of Images; IEEE, Beijing; 1993.

Delp, Edward J. et al.; Moment Preserving Quantization; IEEE; 1991.

Zeng, Bing et al.; Interpolative BTC Image Coding with Vector Quantization; IEEE; 1993.

Lema, Maximo D. et al.; Absolute Moment Block Truncation and Its Application to Color Images; IEEE; 1984.

Wu, Yiyan et al.; Single Bit-Map Block Truncation Coding of Color Images; IEEE; 1992.

Kamel, Mohammed et al.; Image Compression by Variable Block Truncation Coding with Optimal Threshold; IEEE; 1991.

Zeng, B.; Two Interpolative BTC Image Coding Schemes; Electronics Letters; Jun. 1991.

Alsaka, Y. A. et al.; Three Level Block Truncation Coding; IEEE; 1990.

Walach, E.; A Modified Block Truncation Coding Technique for Image Compression; IEEE; 1983.

Lamparter, Bernd et al.; eXtended Color Cell Compression—A Runtime-efficient Compression Scheme for Software Video; 1994.

Kurita, Takio et al.; A Method of Block Truncation Coding for Color Image Compression; IEEE; 1993.

Pei, Soo-Chang et al.; A Novel Block Truncation Coding of Color Images Using a Quaternion-Moment-Preserving Principle; IEEE; 1997.

Chan, Tak Po et al.; Visual Pattern BTC with Two Principle Colors for Color Images; IEEE; 1995.

Qiu, Guoping; Color Image Coding and Indexing Using BTC; IEEE; 1994.

Chan, K. W. et al.; Optimized Adaptive AMBTC; IEEE; 1994.

Dubois, Eric; Effects of Digital Demodulation on Component Coding of NTSC Color Signals; IEEE; 1979.

European Patent Office, International Search Report issued Jul. 14, 2006 for Application No. PCT/IB2006/000700.

Hui, L.; An adaptive block truncation coding algorithm for image compression; ICASSP 90; 1990 International Conference on Acoustics, Speech and Signal Processing; Apr. 3, 1990; pp. 2233-2236.

Goeddel, T.W. et al.; A Two-Dimensional Quantizer for Coding of Digital Imagery; IEEE Transactions on Communications USA; vol. COM-29, No. 1; Jan. 1981; pp. 60-67.

Franti, P. et al.; Compression of Digital Images by Block Truncation Coding: A Survey; Computer Journal; Oxford University Press, Surrey, GB; vol. 37, No. 4; Jan. 1994.

Deering, et al.; Leo: A System for Cost Effective 3D Shaded Graphics; Proceedings of the 20th Annual Conference on Computer Graphics and Interactive Techniques; 1993; pp. 101-108.

Akeley; RealityEngine Graphics; Proceedings of the 20th Annual Conference on Computer Graphics and Interactive Techniques; 1993; pp. 109-116.

* cited by examiner

METHOD AND APPARATUS FOR COMPRESSION OF MULTI-SAMPLED ANTI-ALIASING COLOR DATA

This application claims priority to U.S. Provisional Application Ser. No. 60/447,206, filed Feb. 13, 2003 and is hereby fully incorporated by reference.

BACKGROUND OF THE INVENTION

1. Field of the Invention

This invention relates to the field of image data compression, and in particular color value compression in multi-sampled anti-aliasing applications.

2. Discussion of Related Art

Three dimensional graphics processing applications require the storage and processing of large amounts of data. In particular, color information takes up a large amount of memory. In addition, the time it takes to transfer color data from memory to a graphics processor can negatively affect the ability to process graphics data. There is a need to reduce the amount of memory needed to store graphics data and to improve the ability to quickly transfer graphics data from memory to processor. This problem can be understood by reviewing the way that graphics systems process data.

Computer systems are often used to generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional display image, although displayed using a two dimensional array of pixels, may in fact be created by rendering a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

Aliasing

A phenomenon termed, "aliasing" frequently occurs at the border between two overlapping primitives or surfaces. In aliasing, straight lines are displayed such that a stair step effect develops. Pixels are not mathematical points which are either on or off a line. Instead, pixels have a finite width, and, typically, a pixel is considered on a line if the line passes through the pixel's area.

FIG. 1 illustrates an example of aliasing. Edge 1 of a polygon (100) passes through pixels 5, (125), 6 (130), 7 (135), 8 (140), and 9 (145). Thus, polygon 100 covers pixels 5, 6, 7, 8, and 9. These pixels are shaded and pixels 1 (105), 2 (110), 3 (115), and 4 (120) are not shaded. The resulting display looks like a jagged stair step rather than a line.

Anti-Aliasing

One anti-aliasing technique adjusts pixel colors where aliasing occurs in an attempt to smooth the display. For example, a pixel's intensity may depend on the length of the line segment that falls in the pixel's area.

FIG. 2A illustrates an example of anti-aliasing. Edge 1 (200) of a polygon passes through pixels 5, (225), 6 (230), 7 (235), 8 (240), and 9 (245). However, the edge passes through a small portion of pixel 5, so the intensity of the pixel is low. The intensity of pixel 8 is higher because more of the edge passes through pixel 8. Pixel 9 is completely within the polygon, thus it has the darkest shade. Likewise, the intensities of pixels 6 and 7 are also higher. Pixels 1 (205), 2 (210), 3 (215), and 4 (220) are not shaded because the edge does not pass through them. These pixels lie outside of polygon 200. With the intensity adjusted per the amount of pixel lying within the polygon, the resulting edge on the display is smoother than the aliased edge.

Multi-sampling is another anti-aliasing technique for determining the color of a pixel. Each pixel is divided into sub-pixels, or samples. A color is determined for each sample, and the sample colors are combined to yield a color for the entire pixel. For example, suppose that each pixel in FIG. 2A is further divided into four samples. Then each sample would cover ¼ of the area of the original pixel, as shown in FIG. 2B. Thus pixel 6 (220) would be of a darker color because two of its samples are covered by the intersecting edge. In contrast, pixel 5 (225) would be of a light color because only one of its samples is covered by the intersecting edge. Thus in simplified terms, pixel 6 (230) may have 50% color contribution from the dark color from polygon 200 and 50% color contribution from the clear background. Thus its final color would be of a 50% shading. Pixel 5 (225) may have 25% color contribution from the dark color from polygon 200 and 75% color contribution from the clear background. Thus its final color would be of a 25% shading. It must be noted this is an illustration only and in practice, the number of samples do vary and the granularity depicted in the figures are not to proportion to the actual thickness of the lines and pixels. Also, it can be seen that the more samples a system employs, the better the anti-aliasing can become. However, the demand on system resources increases in proportion to the number of samples.

Rendering

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive, and a drawing command. Examples of attribute parameters for primitives include color and depth, or "Z" data. Three-dimensional data includes not only horizontal and vertical components on an X and Y axis, but also include a depth component along an axis labeled Z. The execution of drawing commands to generate a display image is known as graphics processing.

Three-dimensional data processing is very data intensive. The color data for a pixel is typically 24 or 32 bits. For a megapixel display, large amounts of storage are required just to store the data to be displayed. Compression schemes are needed to reduce the amount of data transferred between the memory and the processor to improve performance.

SUMMARY OF THE INVENTION

The present invention provides a scheme for compressing the color components of image data. One embodiment of the present invention provides for a compression scheme to reduce the amount of data that needs to be stored in memory, and in particular cache memory. The compressed data format can improve the transfer rate between cache memory and the processor and increase the amount of data that can be processed by the graphics processor.

In multi-sampled anti-aliasing applications, pixels are divided into sub-pixels, or samples. Each sample has an associated color. As the number of samples per pixel grows, the amount of data that needs to be transferred between the memory and the processor increases dramatically. In one embodiment, adjacent pixels are grouped into rectangular tiles. The color values of the samples within each are then stored in a compressed format for that tile with an appropriate encoded pointer. In one embodiment, duplicate colors are stored only once. The color entries within the compressed format are accessed by decoding the pointer.

The compression schemes of the present invention take advantage of that fact that in multi-sampled anti-aliasing applications, samples, not pixels, tend to have the same color values. Other prior art types of color compression are geared toward taking advantage of pixel to pixel correlation. In contrast, in multi-sampled anti-aliasing applications, the dominant pattern is a stubble pattern where adjacent pixels are usually not of the same color. Instead, the present invention takes advantage of the sample to sample correlation that exists within the pixels.

In one embodiment, color information associated with each sample is stored in a compressed format with a pointer. The pointer has a single bit associated with each sample in the tile, with the single bit pointing to the color entry stored in the compressed format. In one embodiment, for a pixel with four samples each, this compressed format reduces the amount of storage required from four words per pixel to two words per pixel. Thus it cuts down the required memory size roughly in half over the uncompressed format. In one embodiment, a short-hand encoding is used to further reduce the size of the pointer. In another embodiment, color information associated with each sample is stored in a compressed format wherein only one word per pixel is needed.

The present invention provides a method of organizing adjacent pixels into tiles. The method selects an appropriate compression embodiment for each tile based on criteria including duplicate colors found within the each tile and the orientation of the geometric primitives (triangles) that are drawn on top of the area defined by each tile. It is a generic method that can select an appropriate compression for tiles of various sizes with various numbers of triangle primitives in various orientations.

Another embodiment of the present invention comprises a memory and graphics processor configuration that incorporates the tile compression schemes. The configuration defines the sizes of the tiles in main memory and cache memory. In one embodiment, 4×4 tiles are stored in the main memory. As needed, these tiles are called up from main memory, divided into 2×2 tiles and compressed according to the compression schemes of the present invention. The resultant 2×2 tiles are stored in cache memory. Then the 2×2 tiles are called into graphics processor as needed for processing. In one embodiment, graphics processor comprises a Tile Format Table (TFT) to keep track of the compression format of the incoming files. In another embodiment, two TFTs are used, with one keeping track of the tiles stored in main memory and another keeping track of the tiles stored in cache memory. With the help of TFT, the graphics processor is able to process incoming tiles in their compressed formats, without the need of decompression. This speeds up overall system performance. In one embodiment, the TFT is also used to enable a "Fast Clear" operation where the graphics processor can quickly clear the cache memory. In another embodiment, the process performs resolve operations on sample colors. In these operations, the sample colors are combined to get the final color of the pixel. The compression schemes of the present invention also enable the processor to optimize the procedure of the resolve operation.

DETAILED DESCRIPTION OF THE INVENTION

A method and apparatus for compression of color image data is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

The present invention provides for compression schemes to reduce the amount of image data that needs to be stored in memory. The compressed data format can improve the transfer rate between cache memory and the graphics processor and increase the amount of data processed at the processor. Also, the compressed data needs no decompression prior to being processed by the graphics processor. In one embodiment, the compression scheme is a lossless so that no image information is lost. Embodiments of the present invention group pixels together into tiles for compression and processing.

Multi-Sampled Anti-Aliasing and Tiles

Figure 1:
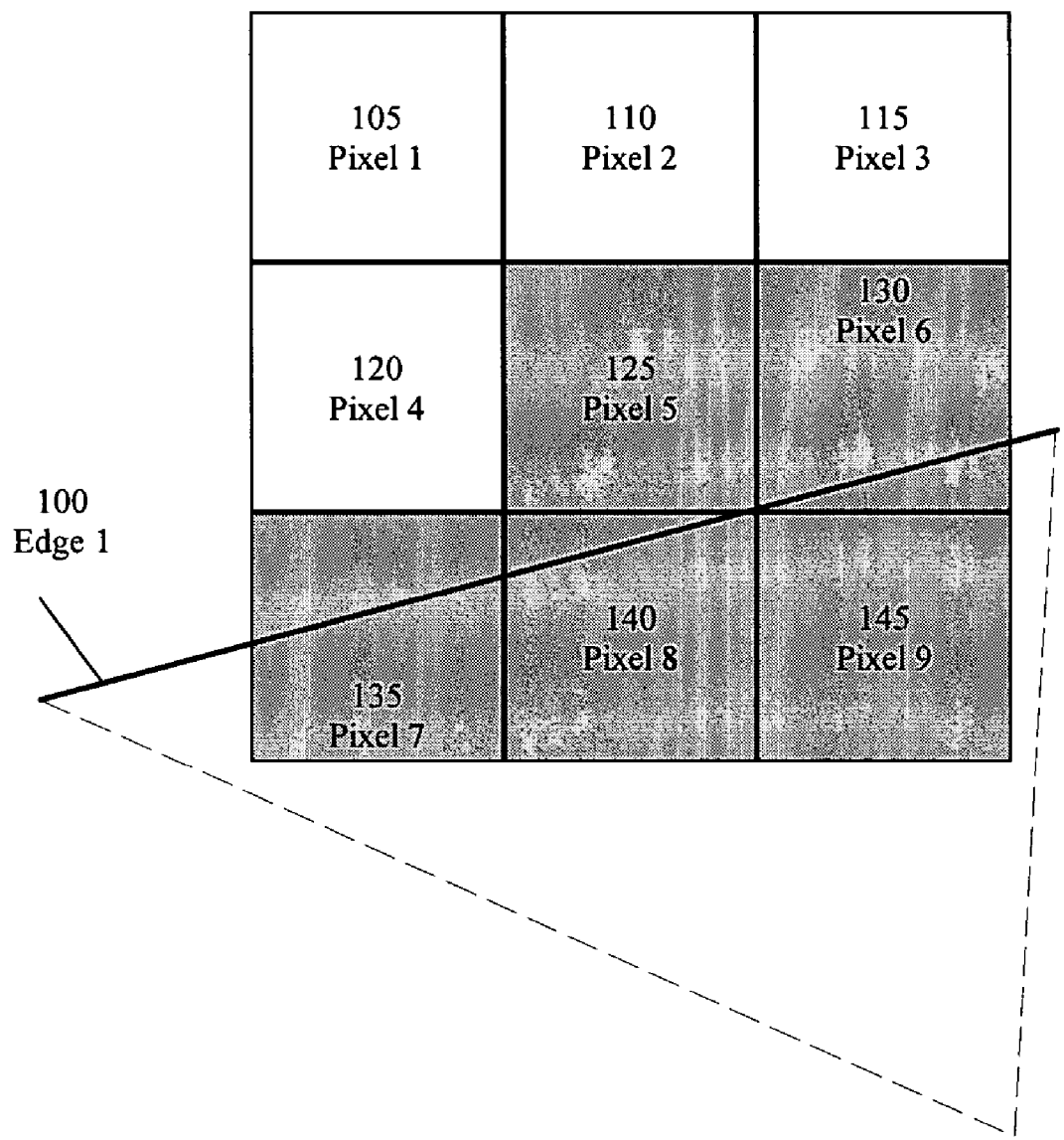
FIG. 1 is a diagram of an example of aliasing.
Figure 2A:
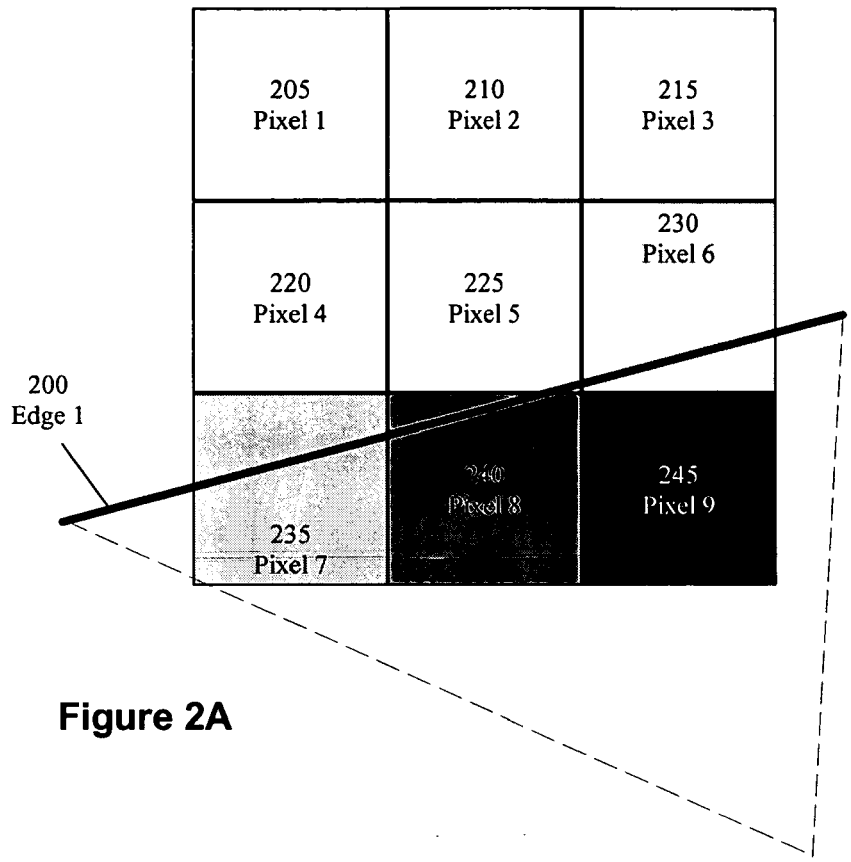
FIG. 2A is a diagram of an example of anti-aliasing.
Figure 2B:
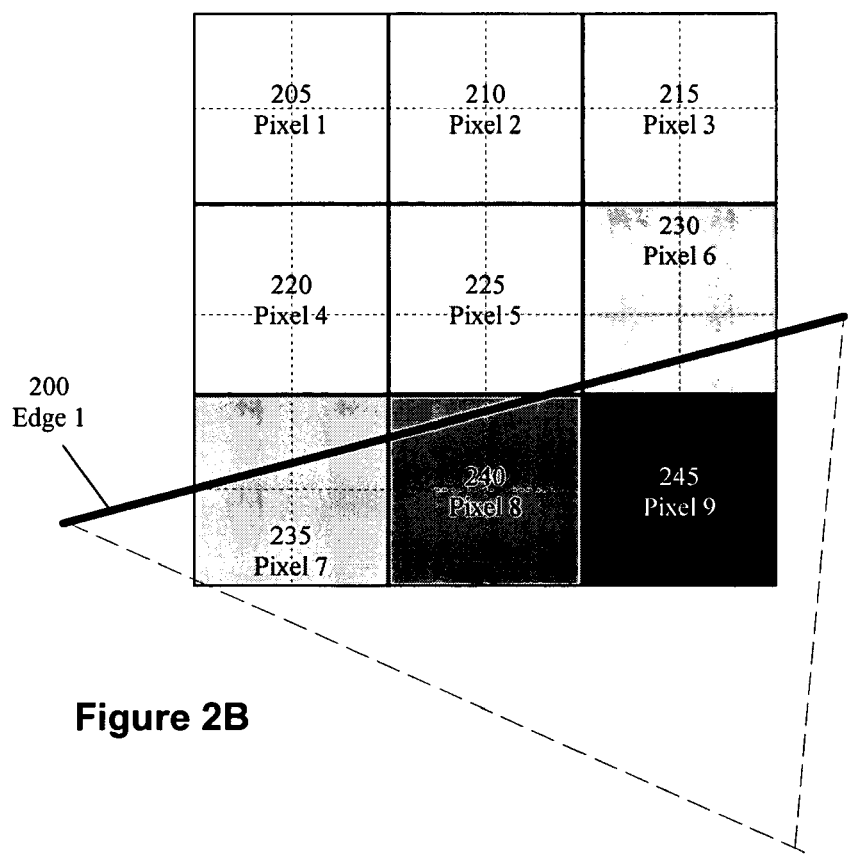
FIG. 2B is a diagram of an example of anti-aliasing with multi-sampling.
Figure 3:
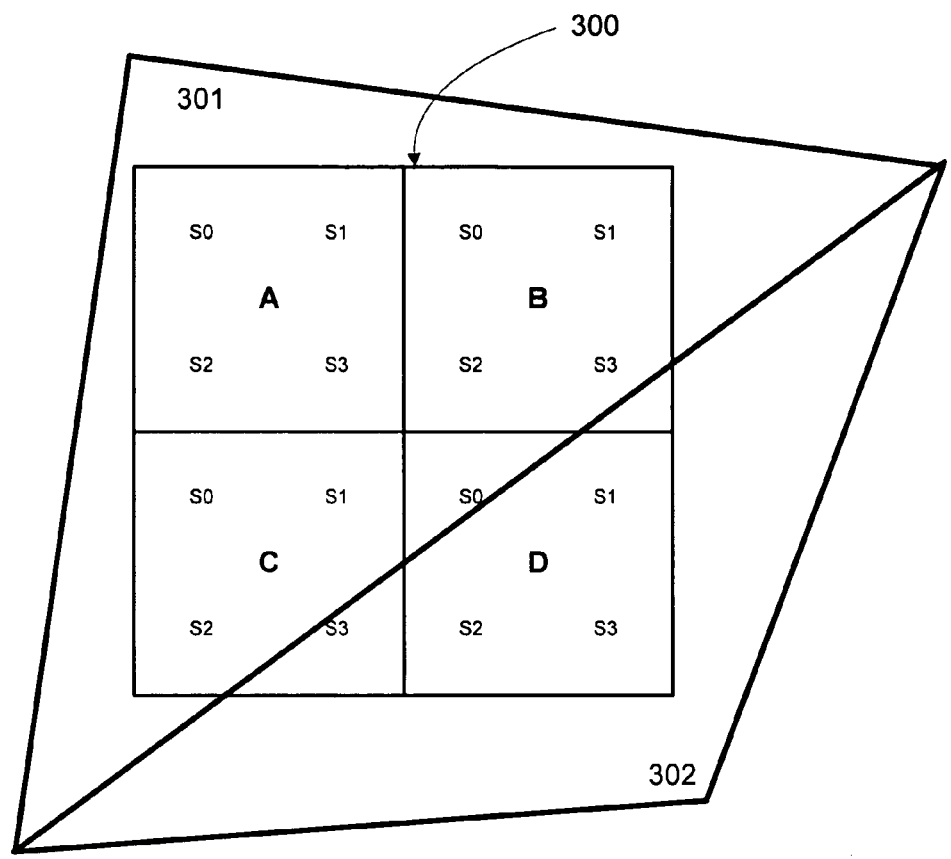
FIG. 3 shows an example tile of pixels with samples covered by two triangle primitives.

One embodiment of the present invention is a compression scheme that operates on tiles (groups of pixels) with the memory. To illustrate, an example tile 300 is shown in FIG. 3. Tile 300 is two pixels tall by two pixels wide in size. Within tile 300 are four pixels: A, B, C, and D. Furthermore, each pixel has four samples, numbered S0, S1, S2, and S3 as shown in the figure. The final color of the pixel rendered will be a combination of the color value of the four samples.

In this example, two triangles 301 and 302 have been drawn on top of the tile. These triangles are primitive geometric shapes that form more complex shapes on the display. Each pixel can have samples residing wholly within one triangle, or have some samples residing in multiple triangles. For example, all of the samples of pixel A reside in triangle 301. In contrast, pixel C has samples S0, S1, S2 in triangle 301 and sample S3 in triangle 302.

The compression schemes of the present invention take advantage of that fact that in multi-sampled anti-aliasing applications, samples, not pixels, tend to have the same color values. The graphic rasterizer creates only one color value per pixel. However, as geometric shapes are drawn, the edges of triangle primitives cut through pixels and create multiple color values per pixel in multi-sampled anti-aliasing applications. It is observed that these samples within the pixels tend to be of the same color value. Thus they lend themselves well to the pointer lookup table compression schemes of the present invention. Other prior art types of color compression are geared toward taking advantage of pixel to pixel correlation. In contrast, in multi-sampled anti-aliasing applications, the dominant pattern is a stubble pattern where adjacent pixels are usually not of the same color. The repetition of color occurs among samples within individual pixels. Therefore, the present invention takes advantage of the sample to sample correlation that exists within the pixels.

In one embodiment, the color value of each sample receives one of two designations. The first designation is called an original color. An original color refers to the color of a sample lying within the "first" triangle that covers a pixel. The cardinal order assigned to a triangle is arbitrary. The second designation is called a replacement color. A replacement color refers to the color of a sample lying within triangles other than the "first" triangle. Replacement colors are needed only when multiple triangles cover a pixel. For example, in pixel C, samples S0, S1, and S2 are of the original color since they lie within triangle 301, the "first triangle" of pixel C. Sample S3 is of the replacement color since it is within another triangle covering pixel C, triangle 302.

To encode the example setup with two triangles as shown in FIG. 3, memory space for seven colors is needed. The number seven is derived by adding the space needed for the four original colors (one for each of the four pixels) and the three replacement colors that may be needed. The number three is derived from the fact that the line separating the two triangles can at most cut through three pixels. Hence one pixel will always be wholly within a single triangle and need no replacement color. Up to three other pixels will have portions of the two triangles. Hence each pixel will need both an original color and a replacement color.

Several levels of compression can be achieved by using this setup. They are uncompressed, partially compressed and fully compressed. One of the goals of the compression is to reduce bandwidth required in the transmission of data between the processor and the memory. The present invention also defines the criteria by which a level of compression is selected to achieve maximum optimization.

Uncompressed

The first level of compression is the uncompressed level. The table below shows the memory setup in the uncompressed state for example tile 300 of FIG. 3.

TABLE 1

| Pixel A | Pixel B | Pixel C | Pixel D |
|---|---|---|---|
| S0 - Org. Color A0 | S0 - Org. Color B0 | S0 - Org. Color C0 | S0 - Org. Color D0 |
| S1 - Org. Color A0 | S1 - Org. Color B0 | S1 - Org. Color C0 | S1 - Rep. Color D1 |
| S2 - Org. Color A0 | S2 - Org. Color B0 | S2 - Org. Color C0 | S2 - Rep. Color D1 |
| S3 - Org. Color A0 | S3 - Org. Color B0 | S3 - Rep. Color C1 | S3 - Rep. Color D1 |

Each slot in the table represents storing a memory word for the color value of a sample. As can be seen from Table 1, a total of four words per pixel are needed. In general, N words per pixel would be needed, where N is the number of samples. Each sample can be of an original color (denoted as Org. Color A0, Org. Color B0, Org. Color C0 or Org. Color D0) or of a replacement color (denoted as Rep. Color C1, Rep. Color D1, etc.). In this example, only two replacement colors are needed. At this level, no compression takes place and the color of each sample is stored as is.

Partially Compressed

The second level of compression is the partially compressed level. At this level of compression, only two words per pixel are required. Additionally, a pointer is used to encoding the compression. The pointer is encoded as follows:

TABLE 2

| Pixel A | Pixel B | Pixel C | Pixel D |
|---|---|---|---|
| 0000 | 0000 | 0001 | 0111 |
| 4 bits | 4 bits | 4 bits | 4 bits |

Figure 4:
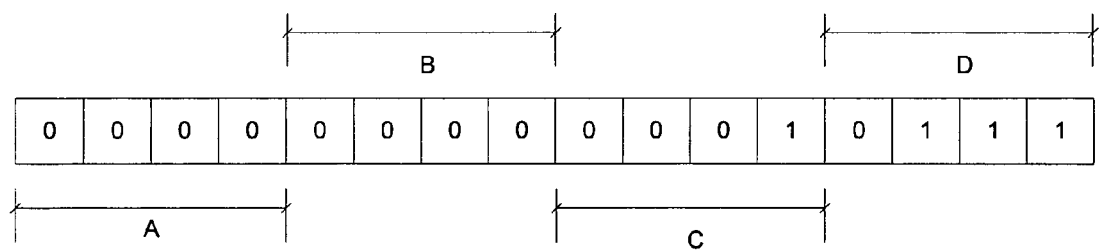
FIG. 4 is an example pointer format used in an embodiment of compression according to the present invention.

The bits of the pointer are also shown in FIG. 4. Notice that 16 bits are needed to encode the 16 samples within the four pixels. In general, one bit is required for each sample. Therefore if more samples are used in each pixel, more bits are required. Each bit is either a "0", which means that the original color for that pixel is used, or a "1", which means that the replacement color for that pixel is used. For example, in pixel A, all four samples (S0, S1, S2, and S3) are of the original color for pixel A. Hence all four bits are encoded "0". In pixel C, samples S0, S1, and S2 are of the original color for pixel C. Thus the first three bits are encoded "0". The last bit is encoded "1" to indicate that sample S3 of pixel C is using the replacement color (since it is covered by triangle 302). The same logic applies for pixels B and D. Hence using this pointer, only two words per pixel need to be stored, with one word for the original color and another for the replacement color, as shown in compressed format of Table 3.

TABLE 3

| Pixel A | Pixel B | Pixel C | Pixel D |
|---|---|---|---|
| Org. Color A0 | Org. Color B0 | Org. Color C0 | Org. Color D0 |
| Rep. Color A1 | Rep. Color B1 | Rep. Color C1 | Rep. Color D1 |

Each sample will have a bit value pointing to either the original color or the replacement color for that pixel. In this scheme, the 2×2 tile can be encoded in eight words using this 16-bit pointer. In one embodiment, the pointers are stored in an unused color entry freed by the compression scheme.

In one embodiment, further compaction can be achieved in the pointer format. This compaction takes advantage of that fact that the edge separating the two triangles can, at most, cut through 3 pixels. Thus, there will always be a pixel where no color replacement is necessary. Instead of using 4 bits of "0" all the time to encode this pixel with no color replacement, the following short-hand bit encoding is used to further compact the pointer word encoding to 14 bits.

TABLE 4

| 2 bits - A - 00 | 4 bits - B | 4 bits - C | 4 bits - D |
| 2 bits - B - 01 | 4 bits - A | 4 bits - C | 4 bits - D |
| 2 bits - C - 10 | 4 bits - A | 4 bits - B | 4 bits - D |
| 2 bits - D - 11 | 4 bits - A | 4 bits - B | 4 bits - C |

In the table, each row represents a possible scenario of compaction. The first two bits are used to encode the four possible ordering of the overall encoding. For example, when "00" is used, the pixel without color replacement is assumed to be pixel A. Then the 12 bits for pixels B, C, and D follow as above in Table 2. Using this short-hand bit encoding, the pointer shown in FIG. 4 would be compacted as the following 14 bits: 00-0000-0001-0111.

The hyphens are added for clarity only to show the bits for pixels B, C, and D. In other cases, if "11" is used, then pixel D is assumed to be the pixel without color replacement (i.e. it has no edges cutting through it), then the 12 bits following would encode the samples for pixels A, B, and C. Compacting the pointers allow more pointers to be stored in the single unused color entry. In general, the compaction replaces all the bits in the pixel that does not have a replacement color with a short-hand encoding. The number of bits of the encoding needed is $\log_2 T$, where T is the number of pixels in the tile. As long as $\log_2 T < S$, where S is the number of samples per pixel, compaction is possible. In cases where S is large, the compaction can allow longer pointers to be compressed and stored in a single unused color entry, which may be 24 or 32 bit long.

Fully Compressed

Figure 5:
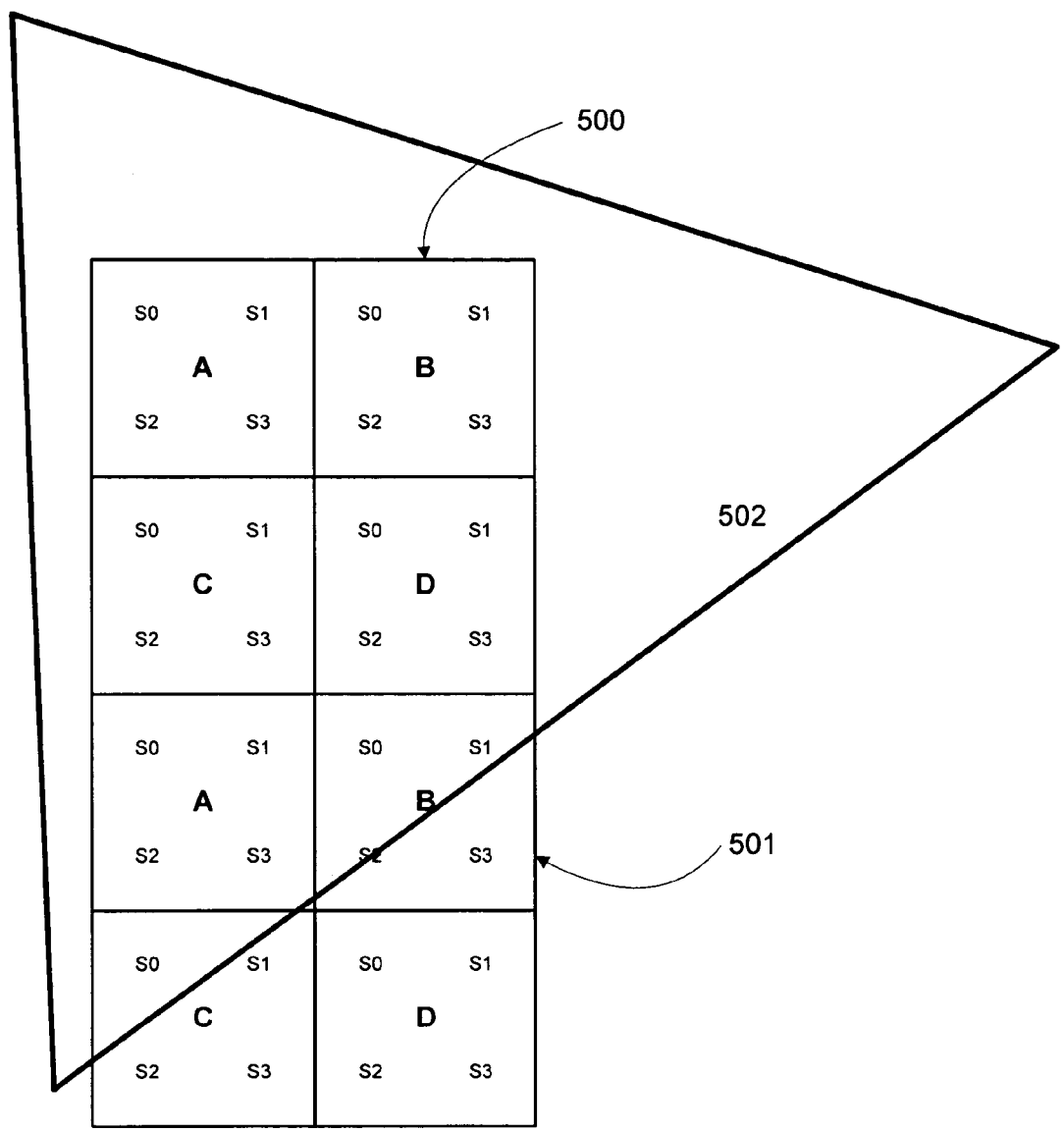
FIG. 5 shows an example tile of pixels with samples covered by one triangle primitive.

At this level of compression, only one word per pixel is needed. This level of compression is possible when one triangle covers the entire 2×2 tile, as shown in FIG. 5. Tile 500 is covered by entirely by triangle 502. When this situation arises, all samples with each pixel are of the same color. Thus the tile can be encoded as follows.

TABLE 5

| Pixel A | Pixel B | Pixel C | Pixel D |
|---|---|---|---|
| Color_A0 | Color_B0 | Color_C0 | Color_D0 |

Hence only one word per pixel is needed. Notice that adjacent tile 501 would not be compressed at the fully compressed level. Since triangle 502 cuts through the tile 501, tile 501 would be appropriately compressed at the partially compressed level.

The configuration shown in FIGS. 3-5 and the corresponding tables cover a frequently observed pattern in tile memory, namely a tile covered by two triangles. Yet it must be noted that these representations in FIGS. 3-5 and the tables above are intended to serve as examples only. In general, the compression schemes described can be applied to tiles of various sizes, tiles with various numbers of samples and colors, and tiles with a plurality of triangle primitives placed in various orientations.

Figure 6A:
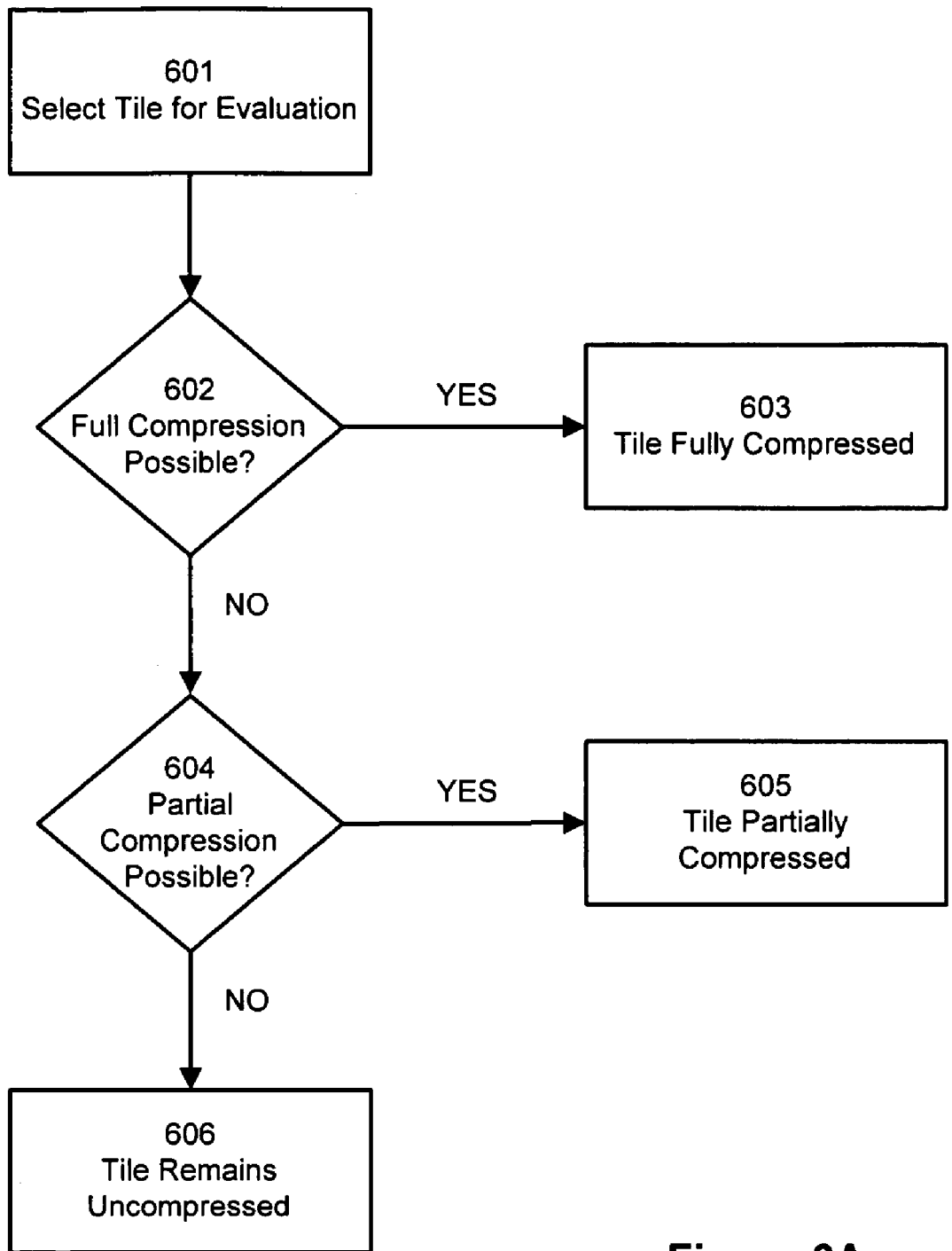
FIG. 6A is a flow diagram representing the process of compressing tiles in accordance with one embodiment of the present invention.

FIG. 6A is a flow chart that shows the operation of compression in one embodiment of the present invention. In step 601, a tile is selected to be evaluated as to which compression is suitable. In step 602, it is determined whether it is fully covered by a single triangle and hence suitable for full compression. If so, the tile is fully compressed in step 603. If not, in step 604 it is determined whether it can be compressed at the partially compressed level. If so, in step 605, the tile is partially compressed. If not, in step 606 the tile emerges from the process uncompressed and is stored as such.

In one embodiment, the check for full compression evaluates the tile to see if it is wholly covered by a triangle, as in the example tile 500 shown in FIG. 5. In another embodiment, the check for partial compression in step 604 is configured to select a tile for compression when no more than two triangles cover it. If more than two triangles cover a tile as shown in the example tile of FIG. 7, such a tile is not selected for partial compression. In the example shown in FIG. 7, tile 700 is covered by parts of four triangles as indicated by the thick lines intersecting in pixel B.

Figure 6B:
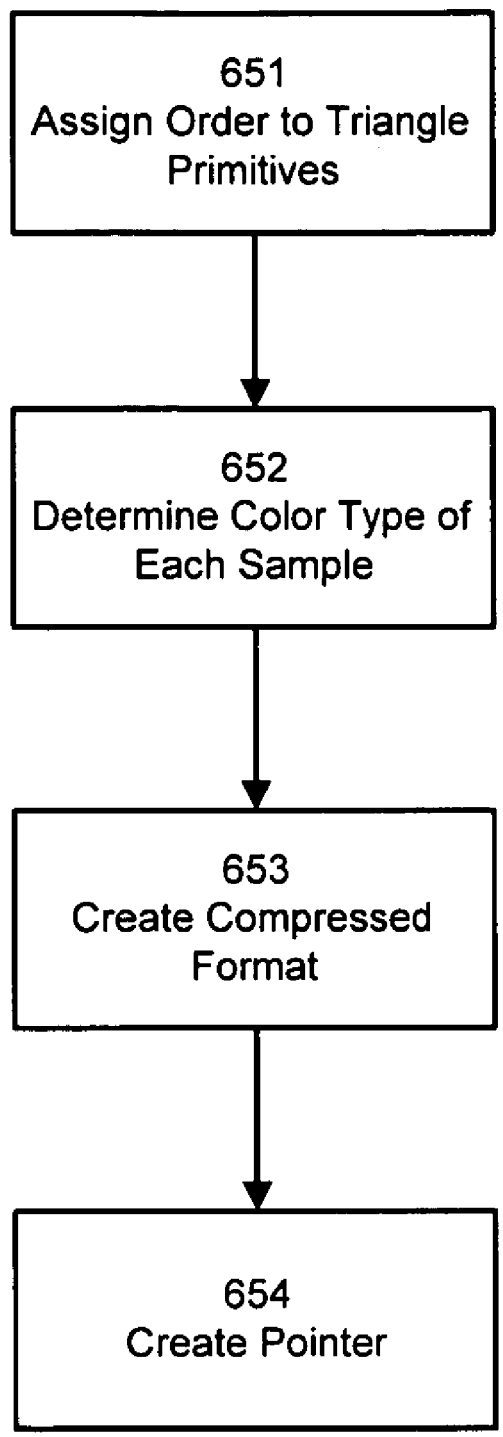
FIG. 6B a flow diagram representing the process of partial compression in accordance with one embodiment of the present invention.

FIG. 6B shows the process of partial compression. Once a tile is designated for partial compression, the system assigns an order to the triangle primitives covering the tile in step 651. This enables the next step 652, which is determining the color type of each sample of said tile. The sample is evaluated as to which triangle primitive it belongs and either an original color designation or a replacement color designation is given. In step 653, a compressed format of color entries is created out of the original data, in accordance to the setup described in the Table 3. In step 654, based on the result obtained in steps 652 and 653, a pointer is created to the compressed format. In one embodiment, the pointer is of the general format shown in FIG. 4. In another embodiment, further compaction depicted in Table 5 is applied to the pointer.

In the present invention, tiles are checked for compression suitability and are sometimes left uncompressed. In general, the configuration of determining whether a tile qualifies for partial compression should take into account whether partial compression will actually result in space saving. In the example shown in FIG. 7, because of the large number of triangles covering the tile, the number of colors that need to be stored may exceed the number of samples. Furthermore, more than one bit per sample will be required in the pointer encoding, resulting in long pointers. Hence, the partial compression format may end up taking more space than the uncompressed format. Care should be taken to select criteria by which a tile is evaluated to be suited for partial compression. The criteria should be configured to deliver good compression results.

Evaluation of tile compression suitability prior to compression can yield better compression results. Also the size of the tile can affect compression result and overall system performance. It can be observed that as the tile size becomes smaller, more tiles would qualify for full compression and partial compression in the present invention. While this reduction in memory requirement is clearly desirable, the tile size decision must be balanced against the additional performance cost of compressing and processing more tiles and memory cost of storing more pointers and other compression information. In one embodiment, the tile size of 2×2 is chosen as a good balance for these two opposing factors.

Processing Optimization

Figure 8A:
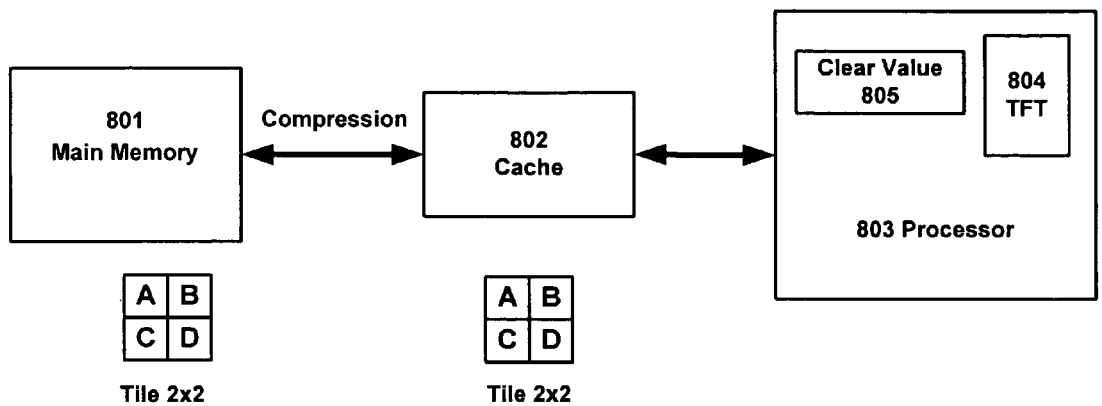
FIG. 8A is a diagram showing the relationship between the memory, the cache, and the graphics process in accordance with one embodiment of the present invention.

In one embodiment, the processor comprises of a Tile Format Table (TFT) to keep track of the format of the tile data in the cache. A Tile Format Table (TFT) is used to record the compression format of each tile after processing. FIG. 8A shows the relationship between main memory 801, the cache 802, and the graphics processor 803. Tiles are transferred from main memory 801 to cache 802 as needed. Tiles undergo compression according to the earlier described scheme and are then stored in cache 802. Then the tiles, in their compressed form, are transferred to graphics processor 803 as needed for processing. It is noted that the tiles need not be decompressed at graphics processor 803, because graphics processor 803 has a TFT 804 to keep track of the compression format of the incoming tiles. Graphics processor 803 can operate on the tile in its compressed format and thus speed up overall operation.

Figure 9:
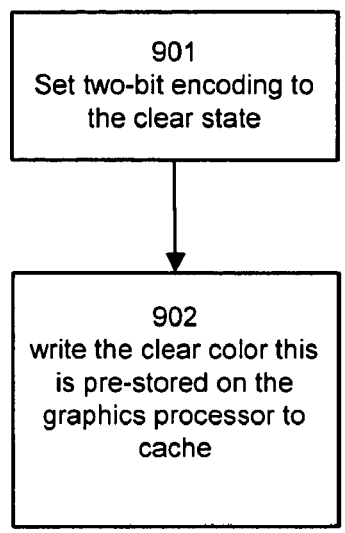
FIG. 9 is a flow chart showing the fast clear operation in accordance with one embodiment of the present invention.

In one embodiment of the TFT, there is an entry for every tile. Each entry has a two-bit compression encoding to indicate the data format of the particular tile. In one embodiment, the two bits encode the following four states:
1. clear
2. fully compressed
3. partially compressed
4. uncompressed The two-bit compression encoding in the TFT alerts the processor as to the format of tile data coming from the cache. The first state indicates a state in which the cache is set to a "clear value" that corresponds to a default empty data state. This state is used for a "Fast Clear" feature as shown in FIG. 9. To clear the cache of any data, in step 901, the processor sets the two-bit encoding to the clear state in the TFT. In step 902, the processor writes in each entry in the cache a default "clear" color value that is pre-stored on a memory register on the processor (shown as component 805 of FIG. 8A). The second, third, and four states of the TFT entry describe the afore-mentioned three levels of compression for the tile: fully compressed, partially compressed, and uncompressed. With the two-bit encoding, the processor can appropriately process the tile data received from the cache.

Figure 8B:
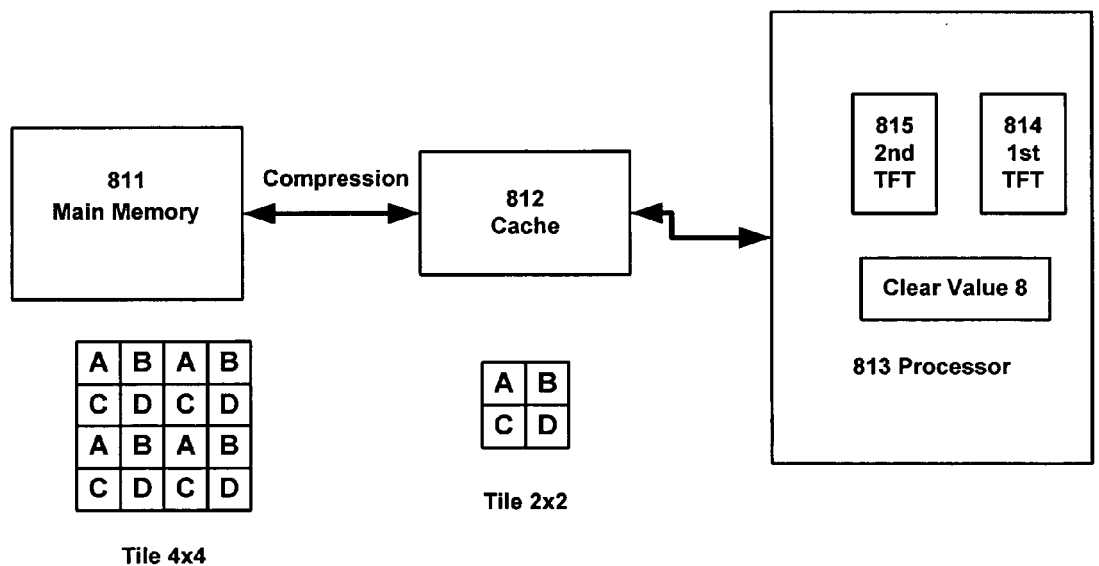
FIG. 8B is another diagram showing the relationship between the memory, the cache, and the graphics process in accordance with one embodiment of the present invention.

In the embodiment depicted in FIG. 8A, the tile size in main memory 801 and cache 802 are the same. The pixels are stored as 2×2 tiles. FIG. 8B depicts another embodiment where the tile size in main memory 811 differs from that of cache 812. In this embodiment, 4×4 tiles are stored in main memory 811 and 2×2 tiles are stored in cache 812. To accommodate this difference, graphics processor 813 comprises of two TFTs, a primary TFT 814 and a secondary TFT 815. In one embodiment, the primary TFT 814 is used to keep track of the compression format of the tiles in main memory 811 and the secondary TFT 815 is used to keep track of the compression format of the tiles in cache 812. In general, the setup of FIG. 8A can be used when the tile size in the main memory is the same as the cache, regardless of the tile size. The setup of FIG. 8B can be used when the tile size in the main memory differs from that of the cache.

Cache Representation

As shown in FIG. 8B, instead of storing 2×2 tiles in memory, one embodiment of the present invention stores 4×4 tiles in memory. The 4×4 tiles in memory are put into cache and broken down into 2×2 tiles for storage. The 2×2 tiles are compressed according to one of the compression schemes. As supposed to a tile format such as 1×4, the 2×2 tile format is found to be the configuration generates good color correlation within each tile. Once in the cache, the tiles are transmitted to the graphics processor in the compressed formats, saving bandwidth. Having a separate TFT 815 for the tiles in the cache allows processing to be performed at a level of granularity that is different from that of memory. One result is that the tile size in main memory is not pegged to the tile size in cache, which is usually chosen for optimized processing and compression purposes. Thus, tiles in the main memory can be bigger and hence requiring fewer entries in the primary TFT 814. The reduction in size of the primary TFT frees up valuable on-processor memory space. Since cache is usually much smaller than memory, few entries are required for the addition of the secondary TFT. Overall memory saving on the processor is thus achieved.

Figure 10:
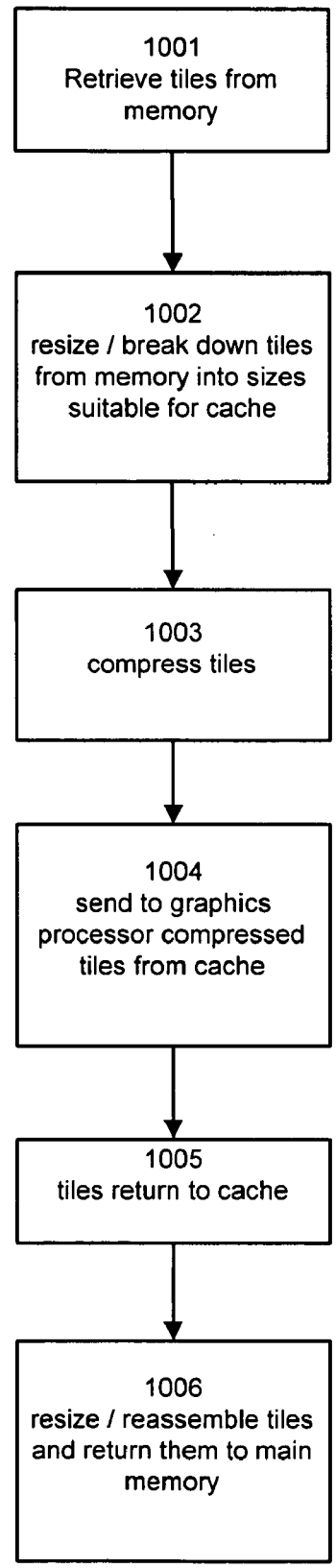
FIG. 10 is a flow chart showing the operation of tile retrieval, tile compression, and tile processing in accordance with one embodiment of the present invention.

The flow chart of FIG. 10 shows the processing of tiles. In step 1001, tiles are retrieved from main memory (e.g. main memory 814). In one embodiment, an occlusion check is performed so that tiles that are occluded by other geometric shapes are not read into cache. In one embodiment, tiles are of size 4×4. The tile size can be different depending on memory configuration. Then in step 1002, the tiles from memory are either resized or broken down into smaller tiles. In one embodiment, each 4×4 tile is separated into four 2×2 tiles. Regardless of tile size, the goal is to create tiles at a level of granularity suitable for compression and processing. In another embodiment, no resizing may be necessary. In step 1003, the tiles are compressed according to the above described compression techniques and the TFT associated with the cache may have its entries updated to reflect the new tiles. In one embodiment, the compression method outlined in FIG. 6 is used. Note that some tiles may not be compressed due do constraints and/or other memory or processing advantages. In step 1004, the compressed tiles from cache are sent to the graphics processor for processing as needed. In step 1005, after the graphics processor operates on the tiles, they are returned to the cache. Finally in step 1006, the tiles in the cache are reassembled or resized into the tiles with size suitable for memory storage and the resized tiles are returned to the memory. In one embodiment, four 2×2 tiles are reassembled into one 4×4 tile and returned to main memory, as shown in FIG. 8B. Of the four tiles, the tile compressed at the lowest compression level becomes the default compression level for the overall resultant tile. For example, if three of the tiles are fully compressed and one tile is partially compressed, then all four of tiles are stored as partially compressed and assembled into one 4×4 partially compressed tile. The TFT table for the main memory (e.g. TFT 814) may be updated to reflect the return of the tiles.

Storing the tiles in compressed formats enables the optimization of the processing of the tiles in the graphics processor. For example, suppose an incoming tile is fully compressed, i.e. all samples within a pixel have the same color value. The processor can rely on the TFT to know that this tile is fully compressed. If the processor needs to draw some new shapes on top on this tile, it only has to blend against one color per pixel instead of blending the new shapes against four samples per pixel. Thus the operation can be accomplished in one cycle instead of four. Similarly, in processing partially compressed tiles, since the processor knows that each sample is of one of two colors, the operation can be accomplished in two cycles instead of four. Since such cases frequently occur in multi-sampled anti-aliasing applications, the present invention thus offers an improvement in processing efficiency.

Figure 7:
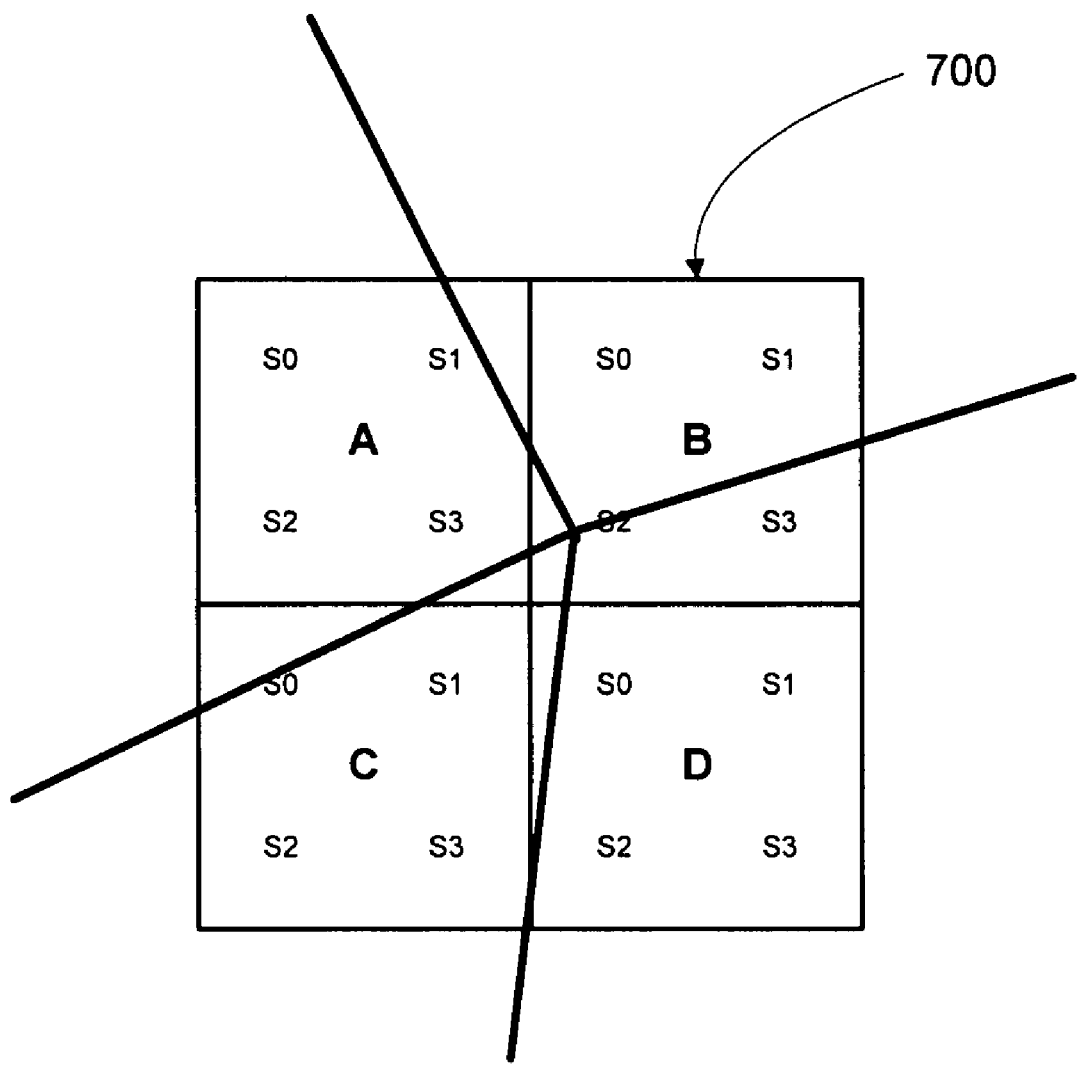
FIG. 7 shows an example tile of pixels with multiple triangle primitives covering its area.

In one embodiment, if a new shape comes in and a configuration similar to FIG. 7 results, then the tile is decompressed back to the uncompressed level at the graphics processor.

Resolve Optimization

One of the common operations performed by graphics processors is the resolve operation. In a resolve operation, samples are combined together with gamma correction. Data is pulled out from cache and then written back into memory with the result that only pixels remain with no more samples are associated with each pixel.

The type of resolve operation that needs to be performed depends on the level of compression of the tiles. First, if the tiles are fully compressed, i.e. there is already only one color per pixel, nothing needs to be done and each pixel in the tile is simply written back into memory. Second, if the tiles are partially compressed or uncompressed, i.e. there are different color samples within each pixel, then the samples are combined to resolve to the final pixel color. In one embodiment, samples with the same colors are only processed once. For example, in FIG. 3, pixel C has three samples (S0, S1, S2) of one color and one sample (S3) of another color. The resolve operation will multiply the color value S0 by three and combine it with one time the color value of S3. Then the combined value is divided by four to obtain the final pixel color value. This saves the processor from having to read the same color value multiple times.

In one embodiment, during the combination some number of least significant bits from each contributing color sample may not be used. The ceiling of the $\log_2 x$, where x is the number of colors being combined, is equal to the number of least significant bits that can be skipped in the combination process.

As more colors are combined to yield the pixel color, more least significant bits are lost. However, the loss of least significant bits does not reduce the color quality of the pixel. If thought of in terms of signal processing, the entire pixel, or signal, is being reproduced by multiple samples. Thus, each individual sample can be of lower precision without affecting the combined signal quality. For example, if two colors are averaged, the least significant bit of either color is lost during the divide operation without loss of color quality. Likewise, if eight colors are averaged, the least significant three bits are lost during the divide operation without loss of color quality. The number of least significant bits lost in the combination process is equal to the number of bits used to index the table of colors. Hence, it is possible to store the colors without some least significant bits, further freeing up memory space.

Embodiment of Computer Execution Environment (Hardware)

Figure 11:
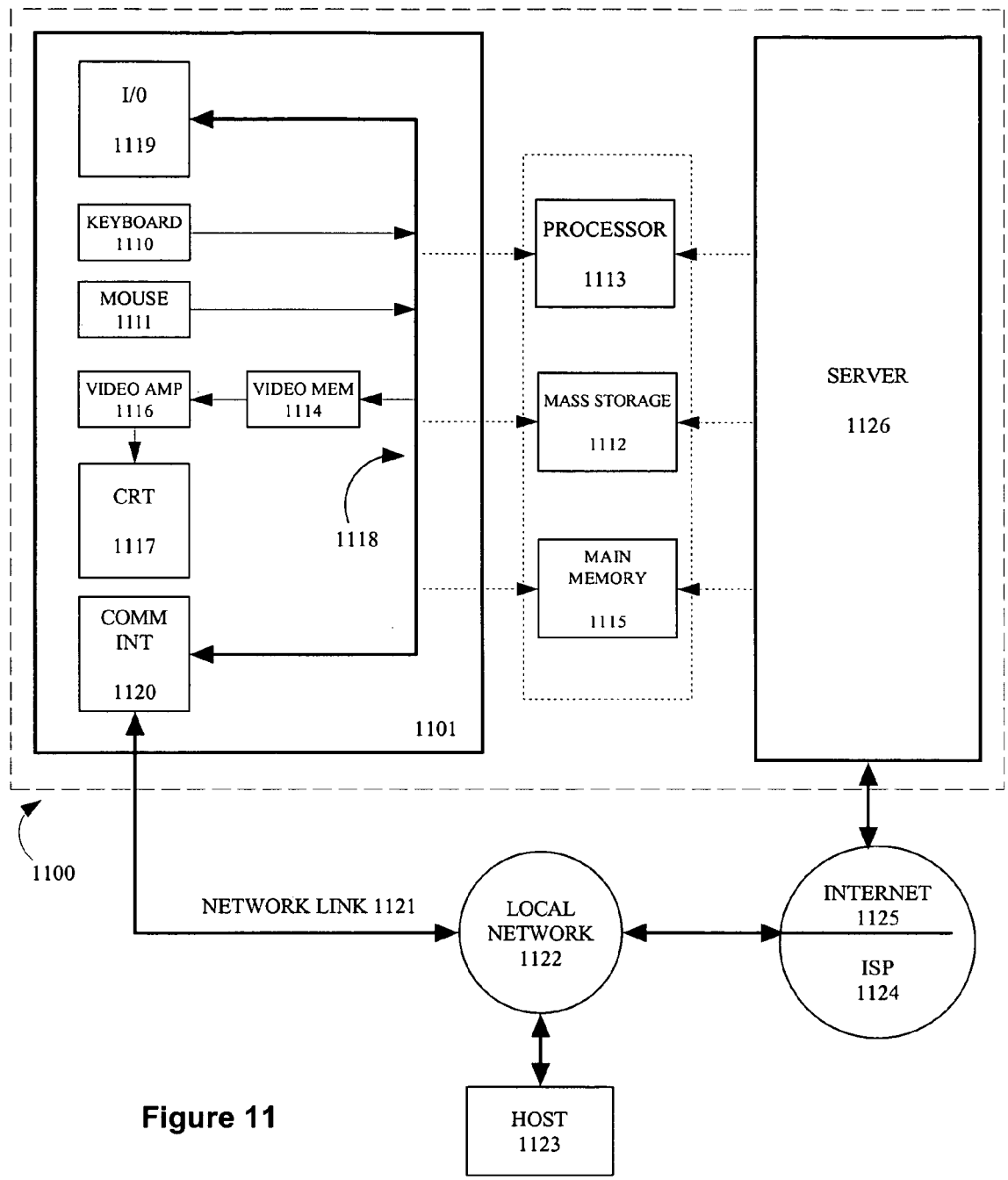
FIG. 11 is a block diagram of a general purpose computer.

An embodiment of the invention can be implemented as computer software in the form of computer readable program code executed in a general purpose computing environment such as environment 1100 illustrated in FIG. 11. A keyboard 1110 and mouse 1111 are coupled to a system bus 1118. The keyboard and mouse are for introducing user input to the computer system and communicating that user input to central processing unit (CPU) 1113. Other suitable input devices may be used in addition to, or in place of, the mouse 1111 and keyboard 1110. I/O (input/output) unit 1119 coupled to bi-directional system bus 1118 represents such I/O elements as a printer, A/V (audio/video) I/O, etc.

Computer 1101 may include a communication interface 1120 coupled to bus 1118. Communication interface 1120 provides a two-way data communication coupling via a network link 1121 to a local network 1122. For example, if communication interface 1120 is an integrated services digital network (ISDN) card or a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals which carry digital data streams representing various types of information.

Network link 1121 typically provides data communication through one or more networks to other data devices. For example, network link 1121 may provide a connection through local network 1122 to local server computer 1123 or to data equipment operated by ISP 1124. ISP 1124 in turn provides data communication services through the world wide packet data communication network now commonly referred to as the "Internet" 1125. Local network 1122 and Internet 1125 both use electrical, electromagnetic or optical signals which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1126 or processor 1113 may have its computational power distributed between computer 1101 and server 1126. Server 1126 symbolically is represented in FIG. 11 as one unit, but server 1126 can also be distributed between multiple "tiers". In one embodiment, server 1126 comprises a middle and back tier where application logic executes in the middle tier and persistent data is obtained in the back tier. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output.

Computer 1101 includes a video memory 1114, main memory 1115 and mass storage 1112, all coupled to bi-directional system bus 1118 along with keyboard 1110, mouse 1111 and processor 1113. As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include the thin-client computing architecture, the palm pilot computing device and other personal digital assistants, Internet ready cellular phones and other Internet computing devices.

The mass storage 1112 may include both fixed and removable media, such as magnetic, optical or magnetic optical storage systems or any other available mass storage technology. Bus 1118 may contain, for example, thirty-two address lines for addressing video memory 1114 or main memory 1115. The system bus 1118 also includes, for example, a 32-bit data bus for transferring data between and among the components, such as processor 1113, main memory 1115, video memory 1114 and mass storage 1112. Alternatively, multiplex data/address lines may be used instead of separate data and address lines.

In one embodiment of the invention, the processor 1113 is any suitable microprocessor or microcomputer that may be utilized. Main memory 1115 is comprised of any memory type suitable for video applications. Video memory 1114 is a dual-ported video random access memory. One port of the video memory 1114 is coupled to video amplifier 1116. The video amplifier 1116 is used to drive monitor 1117. Video amplifier 1116 is well known in the art and may be implemented by any suitable apparatus. This circuitry converts pixel data stored in video memory 1114 to a raster signal suitable for use by monitor 1117. Monitor 1117 is a type of monitor suitable for displaying graphic images.

Computer 1101 can send messages and receive data, including program code, through the network(s), network link 1121, and communication interface 1120. In the Internet example, remote server computer 1126 might transmit a requested code for an application program through Internet 1125, ISP 1124, local network 1122 and communication interface 1120. The received code may be executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122 and communication interface 1120. In this example, computer 1101 performs only input and output functions.

Application code may be embodied in any form of computer program product. A computer program product comprises a medium configured to store or transport computer readable code, or in which computer readable code may be embedded. Some examples of computer program products are DVD-ROM, CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for compression of multi-sampled anti-aliasing color data is described in conjunction with one or more specific embodiments. The invention is defined by the following claims and their full scope and equivalents.

We claim:

1. A method of data compression comprising:
   grouping a plurality of pixel data into a plurality of tiles;
   prior to compression, evaluating said tiles for compression suitability to determine if said tile is to be fully compressed, partially compressed or uncompressed, wherein said full or partial compression recognizes duplicate data and reduces amount of duplicate data stored within said tiles and wherein evaluating prior to compression comprises determining whether partial compression will result in memory space saving compared to uncompressed pixel data; and
   fully or partially compressing said tiles if said tiles are deemed suitable for said full or partial compression;
   wherein said evaluating further comprises:
      determining that a tile is suitable for partial compression when the tile is covered by a plurality of primitives;
      designating said tile for partial compression if it is deemed to be suitable and wherein partial compression comprises employing at least two color designations for subsamples of a same tile to compress data for the tile;
   partially compressing the tile using a single bit to represent each of the at least two color designations; and
   wherein the tile is stored in an uncompressed format when it is covered by more than two primitives.

2. The method of claim 1 wherein said pixel data is color information.

3. The method of claim 1 wherein said evaluating further comprises:
   determining whether a tile is suitable for full compression;
   designating said tile for full compression if it is deemed to be suitable.

4. The method of claim 3 wherein said determining whether the tile is suitable for full compression further comprises:
   determining whether said tile is wholly covered by a triangle primitive.

5. The method of claim 3 wherein said fully compressing further comprises:
   storing a single color entry for each pixel in said tile.

6. The method of claim 3 wherein said full compression compresses said pixel data into one word per pixel.

7. The method of claim 1 wherein said determining that a tile is suitable for partial compression further comprises:
   determining whether said tile is covered by no more than two triangle primitives.

8. The method of claim 1 wherein said partial compressing further comprises:
   assigning an order to triangle primitives covering said tile;
   determining the color type of each sample of said tile;
   creating a compressed format of color entries out of said pixel data;
   creating a pointer to said compressed format.

9. The method of claim 8 wherein said pointer comprises a bit encoding associated with each sample in said tile, wherein each bit represents an index to entries in said compressed format.

10. The method of claim 9 wherein said pointer further comprises a short-hand bit encoding scheme for encoding a pixel with no replacement colors.

11. The method of claim 1 wherein said partial compression compresses said pixel data into two words per pixel.

12. The method of claim 1 wherein said tiles are 2×2 in size.

13. A graphics processing apparatus comprising:
   a grouping unit configured to group a plurality of pixel data into a plurality of tiles;
   an evaluation unit configured to evaluate said tiles for compression suitability prior to compression to determine if a tile is to be fully compressed, partially compressed or uncompressed, wherein said full or partial compression recognizes duplicate data and reduces amount of duplicate data stored within said tiles and determines whether a tile is suitable for partial compression when the tile is covered by a plurality of primitives and wherein evaluating prior to compression comprises determining whether partial compression will result in memory space saving compared to uncompressed pixel data and determining that a tile is to be stored in an uncompressed format when it is covered by more than two primitives;
   a compression unit configured to partially compress tiles if they are suitable for partial compression and wherein partial compression comprises employing at least two color designations for subsamples of a same tile to compress data for the tile and wherein the compression unit is operative to partially compress the tile using a single bit to represent each of the at least two color designations.

14. The graphics processing apparatus of claim 13, wherein said pixel data is color information.

15. The graphics processing apparatus of claim 13 wherein said tiles are 2×2 in size.

16. A computer program product comprising:
   a non-transitory computer readable medium having computer readable program code embodied therein configured for data compression, comprising:
   computer readable code configured to cause a computer to group a plurality of pixel data into a plurality of tiles;
   computer readable code configured to cause a computer to evaluate said tiles, prior to compression, for compression suitability to determine if said tile is to be fully compressed, partially compressed or uncompressed, wherein said partial or full compression recognizes duplicate data and reduces amount of duplicate data stored within said tiles and wherein evaluating prior to compression comprises determining whether partial compression will result in memory space saving compared to uncompressed pixel data;

wherein said computer readable code configured to cause a computer to evaluate further causes the computer to:

determine whether a tile is suitable for partial compression when the tile is covered by a plurality of primitives;

designate said tile for partial compression if it is deemed to be suitable and wherein partial compression comprises employing at least two color designations for subsamples of a same tile to compress data for the tile;

partially compress the tile using a single bit to represent each of the at least two color designations; and determine that the tile is to be stored in an uncompressed format when it is covered by more than two primitives.

17. The computer program product of claim 16 wherein said pixel data is color information.

18. The computer program product of claim 16 wherein said computer readable code configured to cause a computer to evaluate further comprises:

computer readable code configured to cause a computer to determine whether a tile is suitable for full compression;

computer readable code configured to cause a computer to designate said tile for full compression if it is deemed to be suitable.

19. The computer program product of claim 18 wherein said computer readable code configured to cause a computer to determine whether the tile is suitable for full compression further comprises:

computer readable code configured to cause a computer to determine whether said tile is wholly covered by a triangle primitive.

20. The computer program product of claim 18 wherein said computer readable code configured to cause a computer to fully compress further comprises:

computer readable code configured to cause a computer to store a single color entry for each pixel in said tile.

21. The computer program product of claim 18 wherein said full compression compresses said pixel data into one word per pixel.

22. The computer program product of claim 16 wherein said computer readable code configured to cause a computer to determine if a tile is suitable for partial compression further comprises:

computer readable code configured to cause a computer to determine whether said tile is covered by no more than two triangle primitives.

23. The computer program product of claim 16 wherein said computer readable code configured to cause a computer to compress further comprises:

computer readable code configured to cause a computer to assign an order to triangle primitives covering said tile;

computer readable code configured to cause a computer to determine the color type of each sample of said tile;

computer readable code configured to cause a computer to create a compressed format of color entries out of said pixel data;

computer readable code configured to cause a computer to create a pointer to said compressed format.

24. The computer program product of claim 23 wherein said pointer comprises a bit encoding associated with each sample in said tile, wherein each bit represents an index to entries in said compressed format.

25. The computer program product of claim 24 wherein said pointer further comprises a short-hand bit encoding scheme for encoding a pixel with no replacement colors.

26. The computer program product of claim 16 wherein said partial compression compresses said pixel data into two words per pixel.

27. The computer program product of claim 16 wherein sail tiles are 2×2 in size.

28. A method of data compression comprising:

grouping a plurality of pixel data into a plurality of tiles;

evaluating said tiles for compression suitability, wherein said compression suitability recognizes duplicate data and reduces amount of duplicate data stored within said tiles and wherein evaluating comprises determining whether partial compression will result in memory space saving compared to uncompressed pixel data;

partially compressing said tiles if said tiles are deemed suitable for said partial compression;

wherein said evaluating further comprises:

determining whether a tile is suitable for full compression by determining whether said tile is wholly covered by a triangle primitive;

designating said tile for full compression if it is deemed to be suitable;

designating said tile for partial compression if it is deemed to be suitable for partial compression wherein partial compression comprises creating a compressed format of color entries out of said pixel data and creating a pointer to compressed format, wherein the pointer comprises a bit encoding associated with each sample in the tile; and storing the tile in an uncompressed format when it is determined to be covered by more than two primitives.

29. A computer program product comprising:

a non-transitory computer readable medium having computer readable program code embodied therein configured for data compression, comprising:

computer readable code configured to cause a computer to:

group a plurality of pixel data into a plurality of tiles;

evaluate said tiles for compression suitability, wherein said compression suitability recognizes duplicate data and reduces amount of duplicate data stored within said tiles;

partially or fully compress said tiles if said tiles are deemed suitable for partial or full compression;

wherein evaluating further comprises:

determining whether a tile is suitable for full compress on by determining whether said tile is wholly covered by a triangle primitive;

designating said tile for full compression if it is deemed to be suitable;

designating said tile for partial compression if it is deemed to be suitable for partial compression wherein partial compression comprises creating a compressed format of color entries out of said pixel data and creating a pointer to said compressed format, wherein the pointer comprises a bit encoding associated with each sample in the tile; and storing the tile in an uncompressed format when it is covered by more than two primitives.

30. A method of data compression comprising:

grouping a plurality of pixel data into a plurality of tiles;

evaluating said tiles for compression suitability, wherein said compression suitability recognizes duplicate data and reduces an amount of duplicate data stored within said tiles and wherein evaluating comprises determining whether partial compression will result in memory space saving compared to uncompressed pixel data;
partially compressing said tiles if said tiles are deemed suitably for said partial compression;
wherein said evaluating further comprises:
   determining whether a tile is suitable for partial compression by determining whether said tile is covered by no more than two triangle primitives;
   designating said tile for partial compression if it is deemed to be suitable; and
storing the tile in an uncompressed format when it is covered by more than two primitives.

31. A computer program product comprising:
a non-transitory computer readable medium having computer readable program code embodied therein configured for data compression, comprising:
computer readable code configured to cause a computer to:
group a plurality of pixel data into a plurality of tiles;
evaluate said tiles for compression suitability, wherein said compression suitability recognizes duplicate data and reduces amount of duplicate data stored within said resized tiles and wherein evaluating comprises determining whether partial compression will result in memory space saving compared to uncompressed pixel data;
partially compress said tiles if said tiles are deemed suitable for said partial compression;
wherein evaluating further comprises:
   determining whether a tile is suitable for partial compression by determining whether said tile is covered by no more than two triangle primitives;
   designating said tile for partial compression if it is deemed to be suitable and
storing the tile in an uncompressed format when it is covered by more than two primitives.

32. A computer program product comprising:
a non-transitory computer readable medium having computer readable program code embodied therein configured for data compression, comprising:
   computer readable code configured to cause a computer to:
      group a plurality of pixel data into a plurality of tiles;
      evaluate said tiles for compression suitability, wherein said compression suitability recognizes duplicate data and reduces an amount of duplicate data stored within said tiles and wherein evaluating prior to compression comprises determining whether partial compression will result in memory space saving compared to uncompressed pixel data;
      compress said tiles if said tiles are deemed suitable for said compression;
   wherein evaluating further comprises:
      determining whether a tile is suitable for partial compression;
      designating said tile for partial compression if it is deemed to be suitable;
   wherein partial compressing further comprises:
      assigning an order to triangle primitives covering said tile;
      determining the color type of each sample of said tile;
      creating a compressed format of color entries out of said pixel data;
      creating a pointer to said compressed format; and
storing the tile in an uncompressed format when it is covered by more than two primitives.

33. The method of claim 1 wherein partial compression comprises employing pointers to designate samples that correspond to an original color designation and a replacement color designation.

34. The method of claim 1 wherein the method is carried out by a graphics processor.

35. The method of claim 28 wherein the method is carried out by a graphics processor.

36. The method of claim 30 wherein the method is carried out by a graphics processor.

37. A method of data compression comprising:
grouping a plurality of pixel data into a plurality of tiles;
evaluating said tiles for compression suitability, wherein said compression suitability recognizes duplicate data and reduces amount of duplicate data stored within said tiles; and
partially compressing said tiles if said tiles are deemed suitable for said partial compression;
wherein said evaluating further comprises:
   determining whether a tile is suitable for partial compression; and
   designating said tile for partial compression if it is deemed to be suitable;
wherein said partial compressing further comprises:
   assigning an order to triangle primitives covering said tile;
   determining the color type of each sample of said tile;
   creating a compressed format of color entries out of said pixel data; and
   creating a pointer to said compressed format;
   wherein said pointer comprises a bit encoding associated with each sample in said tile, wherein each bit represents an index to entries in said compressed format;
wherein said pointer further comprises a short-hand bit encoding scheme for encoding a pixel with no replacement colors; and
wherein the tile is stored in an uncompressed format when it is covered by more than two primitives.

38. A computer program product comprising:
a non-transitory computer readable medium having computer readable program code embodied therein configured for data compression, comprising:
   computer readable code configured to cause a computer to group a plurality of pixel data into a plurality of tiles;
   computer readable code configured to cause a computer to evaluate said tiles for compression suitability, wherein said compression suitability recognizes duplicate data and reduces amount of duplicate data stored within said tiles;
   computer readable code configured to cause a computer to partially compress said tiles if said tiles are deemed suitable for said partial compression;
   wherein said computer readable code configured to cause a computer to evaluate further comprises:
      determining whether a tile is suitable for partial compression; and
      designating said tile for partial compression if it is deemed to be suitable;
   wherein said computer readable code configured to cause a computer to partially compress further comprises:
      computer readable code configured to cause a computer to assign an order to triangle primitives covering said tile;
      computer readable code configured to cause a computer to determine the color type of each sample of said tile;

computer readable code configured to cause a computer to create a compressed format of color entries out of said pixel data;

computer readable code configured to cause a computer to create a pointer to said compressed format;

wherein said pointer comprises a bit encoding associated with each sample in said tile, wherein each bit represents an index to entries in said partial compressed format;

wherein said pointer further comprises a short-hand bit encoding scheme for encoding a pixel with no replacement colors; and wherein the tile is stored in an uncompressed format when it is covered by more than two primitives.

* * * * *